United States Patent [19]

Bowerman

[11] 3,841,769
[45] Oct. 15, 1974

[54] ANGULARLY ADJUSTABLE BRACKET
[76] Inventor: William R. Bowerman, 1824 Mississippi St., Lawrence, Kans. 66044
[22] Filed: Oct. 24, 1972
[21] Appl. No.: 299,929

[52] U.S. Cl. .................... 403/90, 248/478, 248/483
[51] Int. Cl. ............................................. F16c 11/06
[58] Field of Search ............ 248/288, 478, 482, 483; 403/90

[56] References Cited
UNITED STATES PATENTS

| 404,021 | 5/1889 | Tice | 287/12 X |
|---|---|---|---|
| 675,106 | 5/1901 | Oberle | 287/12 X |
| 892,105 | 6/1908 | White | 287/12 X |
| 973,319 | 10/1910 | Thumen et al. | 287/12 X |
| 1,639,441 | 8/1927 | Spahr | 287/87 X |
| 1,806,059 | 5/1931 | Hoople | 248/483 X |
| 2,256,763 | 9/1941 | Reed | 287/12 X |
| 2,566,497 | 9/1951 | Morley | 403/90 X |
| 3,433,510 | 3/1969 | Hulterstrum | 306/9 X |
| 3,539,208 | 11/1970 | Gonzalves | 287/12 |

FOREIGN PATENTS OR APPLICATIONS
17,919  8/1898  Great Britain ...................... 248/482

Primary Examiner—William H. Scholtz
Attorney, Agent, or Firm—Morse, Altman, Oates & Bello

[57] ABSTRACT

A fixed support is formed with a toothed, concave surface releasably engaging a cooperating convex portion of an angularly adjustable member. The convex surface is dimpled and a resilient coupling urges the convex surface to the concave surface for locking engagement. The angular relationship is changed by temporarily separating the toothed surface from the dimpled surface, changing the angle of the member and then releasing the member to return it to a locked position. The bracket assembly is particularly useful for mounting rear-view mirrors and the like.

6 Claims, 5 Drawing Figures

PATENTED OCT 15 1974  3,841,769
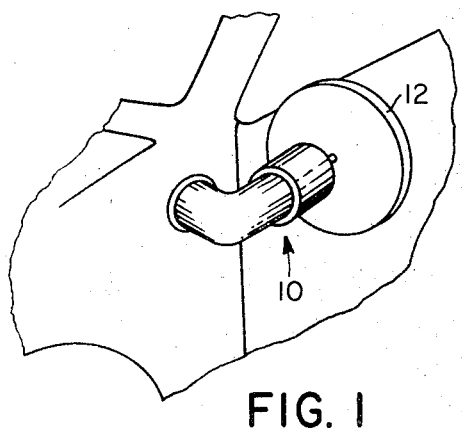
FIG. 1
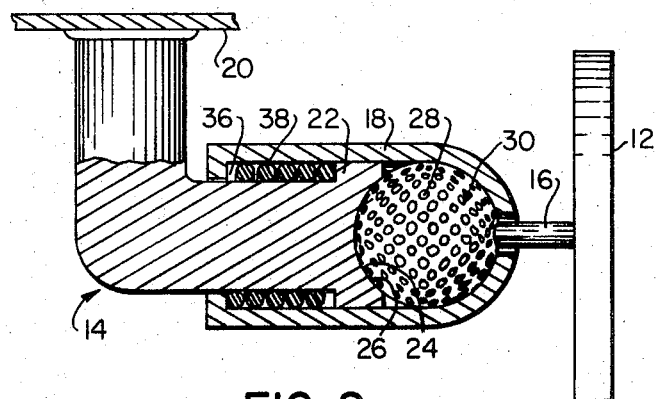
FIG. 2
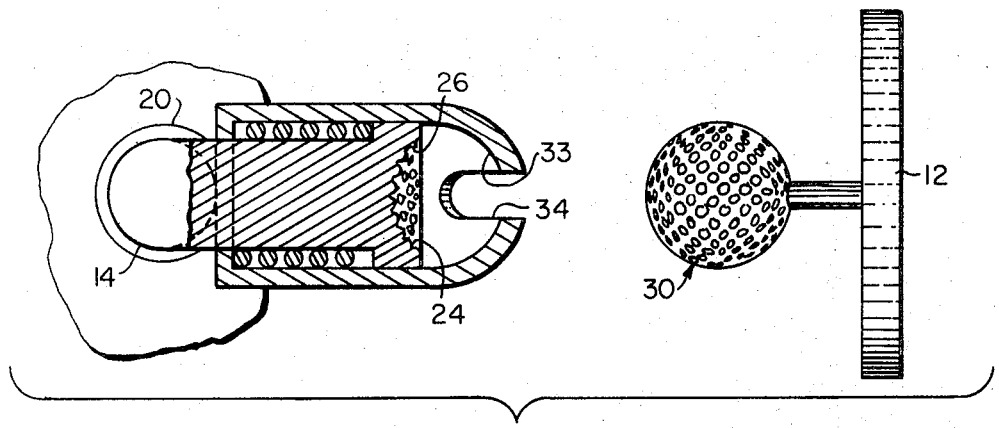
FIG. 3
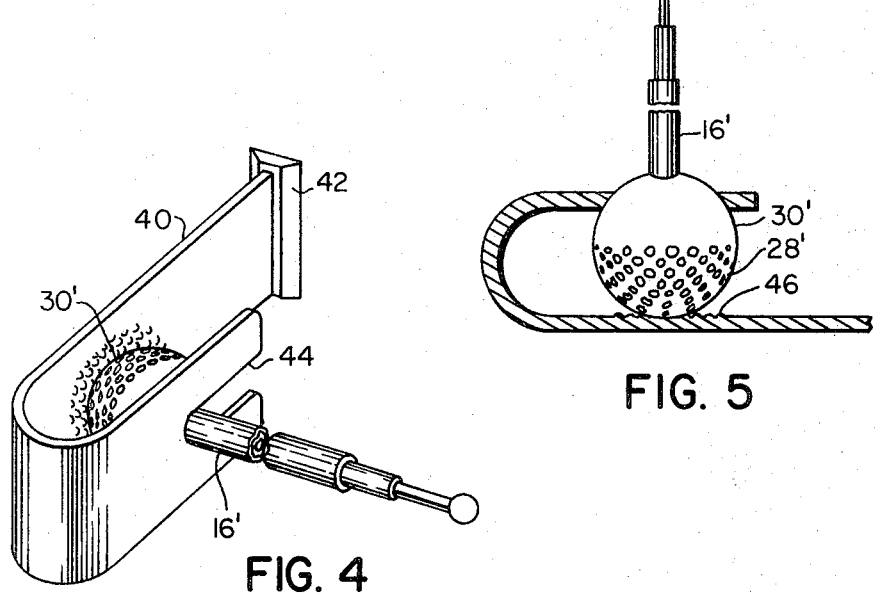
FIG. 4
FIG. 5

ANGULARLY ADJUSTABLE BRACKET

BACKGROUND OF THE INVENTION

1. Field of the Invention

This invention relates generally to adjustable mounting brackets and more particularly is directed towards a new and improved angularly adjustable bracket having a wide variety of locked angular positions.

2. Description of the Prior Art

Angularly adjustable mounting brackets are used for a number of different applications. Once such application is for mounting rear-view mirrors on automobiles. Such mounting brackets allow a driver to adjust the rear-view mirror to an angular position best suited to an individual's height and posture. Most brackets of this type utilize friction joints between the fixed portion of the bracket and the movable portion. However, a frictional coupling arrangement is not entirely satisfactory for several reasons. First of all, to maintain the angular position between the parts over an extended period requires a high degree of frictional engagement. This characteristic makes adjustment difficult. If the frictional contact is reduced, the angular relationship may easily be altered through an accidental bumping of the mirror or through normal road vibration. In any event, the frictional contact is subject to wear and, in time, may become so low that the mirror will not stay in position even for a brief period.

Accordingly, it is an object of the present invention to provide a new improved coupling arrangement between two cooperating members for selectively locking the members in a preselected angular position and yet allowing the members to be reset easily to a different angular position. Another object of this invention is to provide a new and improved mounting bracket for rear-view mirrors and the like.

SUMMARY OF THE INVENTION

This invention features an angularly adjustable coupling for use as a mirror mounting bracket or the like comprising a first member formed with a toothed concave face and a second member formed with dimpled convex face detachably engaging the concave face. Spring means engage the second member for holding the dimpled convex face in locking engagement with the toothed face. The spring means is sufficiently resilient to allow temporary disengagement between the two faces for changing the angular position of one member with respect to the other. When used as a bracket for a rear-view mirror, the mirror is mounted to the second member. In a modification of the invention, a U-shaped spring support is provided with a toothed surface to engage a dimpled ball mounted between the legs of the member.

Such a device may be used with an indoor television antenna or the like where the antenna arms are subject to frequent changes in angular position.

BRIEF DESCRIPTION OF THE DRAWINGS

FIG. 1 is a view in perspective showing a rear-view mirror mounting bracket made according to the invention, FIG. 2 is a sectional plan view of the bracket, FIG. 3 is an exploded sectional side view of the bracket, FIG. 4 is a view in perspective showing a modification of the invention, and, FIG. 5 is a top sectional view thereof.

DETAILED DESCRIPTION OF THE PREFERRED EMBODIMENTS

Referring now to the drawings, and to FIGS. 1, 2 and 3 in particular, the reference character 10 generally indicates an angularly adjustable mounting bracket particularly useful with a rear-view mirror 12 on an automobile. While the FIG. 1 embodiment shows the device employed to mount an exterior rearview mirror it may also be used for mounting an interior mirror.

The mounting bracket includes a base support 14 rigidly mounted to the door or fender of the automobile, an angularly adjustable stem member 16 which carries the mirror 12 and a spring-loaded sleeve 18 holding the parts together.

The base support 14, in the illustrated embodiment, is in the form of a rigid bent arm of cylindrical cross-section provided at its offset end with a suitable flange 20 or other fastening means for mounting the arm to the body of the car. The arm 14 at the opposite end is formed with an annular shoulder 22 and a rearwardly facing concave seat 24. The seat 24 is characterized by at least one and preferably a plurality of closely spaced protuberances 26 preferably in the form of teeth of relatively low height and adapted to engage closely spaced indents 28 formed in a ball 30. The ball 30 is mounted on the forward end of the member 16 the opposite end of which carries the mirror 12. The ball need not be a complete sphere or entirely covered with the indents 28 but only that convex portion that engages the toothed seat 24. Preferably the radius of curvature of the seat 24 substantially corresponds with the radius of curvature of the ball 30 to provide a good mechanical fit and coupling action. The device will, however, function if the seat 24 is flat although the locking action is reduced. As an alternative arrangement, the seat 24 may be formed with dimples and the ball 30 may be formed with outwardly projecting teeth so as to provide the same locking action between the parts.

The sleeve 18 at its right-hand end as viewed in FIGS. 1 and 2, is formed with a rounded inner shoulder 32 adapted to snugly receive the ball 30 and restrain it in place. The sleeve is also formed with a re-entrant opening 34 through which the stem member 16 extends. In practice, the opening 34 is somewhat wider than it is high insofar as most rear-view mirrors require a wider range of adjustment in the horizontal plane than in the vertical plane. The opening 34, however, is sufficiently large to permit the mirror to be adjusted through a wide range of positions.

The left-hand end of the sleeve 18 is formed with an inner annular shoulder 36 to engage a coil spring 38 compressed around the arm 14 between the shoulder 22 and the shoulder 36. The spring 38 thus urges the sleeve 18 to the left as viewed in FIGS. 1 and 2, this, in turn, urging the ball 30 into locking engagement with the seat 24. In this position, the angular position of the member 16 will be locked with respect to the support 14 and the mirror 12 will remain in this position until it is intentionally reset. The angular position of the mirror is reset by grabbing the mirror 12 and pulling it to the right sufficiently to overcome the force of the spring 38 and to disengage the ball from the seat. Thus disengaged, the mirror is tilted to a new angular position, as desired, and then released. When released the force of the spring will then lock the ball against the seat with the teeth engaging the indents. The coupling arrangment permits the member 16 to be rotated or adjusted through a wide range of angular positions by a simple hand action. When released, the mirror is locked and will not become dislodged from its position by accidentally brushing against the mirror or through road vibration. The locking action will not deteriorate with repeated use since a positive mechanical locking action takes place rather than a frictional locking action.

As an alternative means for releasably holding the parts together, a magnet may be employed in the seat with the ball being made of steel, for example.

Referring now to FIGS. 4 and 5 of the drawings there is illustrated a modification of the invention and in this embodiment a U-shaped bracket 40 supports an angularly adjustable stem member 16' which, in this embodiment, is an antenna arm, preferably telescopic, for an indoor television antenna. The bracket 40 preferably is fabricated of a flat spring-steel material bent in a U-shape and having a long leg thereof mounted to a plate 42 which may be free standing or secured directly to a television housing. The short leg of the bracket is formed with a re-entrant opening 44 through which the member 16' extends. A dimpled ball 30' is trapped between the two legs of the member 40 with the antenna arm 16' projecting through the opening 44. The inner surface of the member 40 opposite the opening 44 is formed with a highly roughened surface, preferably in the form of short protuberances 46 such as teeth, detents or the like. The protuberances preferably have the same spacing as indents 28' formed on the ball to provide the same type of locking action as in the principal embodiment. Again, the angular position of the arm 16' is set by grasping the antenna and pulling it back sufficiently to disengage the ball from the protuberances 46. The antenna is then set to the desired angle and released to thereby re-engage the ball with the protuberances. This will lock the ball in position until such time as the angular attitude of the antenna is to be reset again.

While the invention has been described primarily with respect to a rear-view mirror and an antenna, the coupling arrangement may be employed to advantage in other applications where a pair of articulated members are to be temporarily locked in a particular angular position.

Having thus described the invention what I claim and desire to obtain by Letters Patent of the United States is:

1. An angularly adjustable coupling, comprising
   a. a relatively fixed first member,
   b. a relatively movable second member, and
   c. resilient means urging said members into releasable engagement with one another including a relatively movable sleeve telescoped over said first and second members and a coil spring mounted within said sleeve and engaging one of said members and said sleeve, said sleeve engaging the other of said members,
   d. one of said members being formed with a convex portion and the other being formed with a cooperating seat portion releasably engageable with said convex portion,
   e. one of said seat portion and said convex portion being formed with at least a plurality of protuberances and the other being formed with spaced indents to releasably receive said protuberances,
   f. said members being free for temporary separation by pulling said members apart against the force of said resilient means whereby the angular relation of said member may be altered.

2. An angularly adjustable coupling according to claim 1 including a mirror mounted to one of said members.

3. An angularly adjustable coupling according to claim 1 wherein said seat portion is concave.

4. An angularly adjustable coupling according to claim 1 wherein said convex portion is a sphere.

5. An angularly adjustable coupling according to claim 1 wherein said protuberance is a tooth.

6. An angularly adjustable coupling according to claim 1 wherein said sleeve is formed with a restricted opening at one end thereof for projection of one of said members therethrough.

* * * * *